April 9, 1935. S. B. BOWMAN 1,997,510
GLASS FEEDER
Filed July 27, 1932
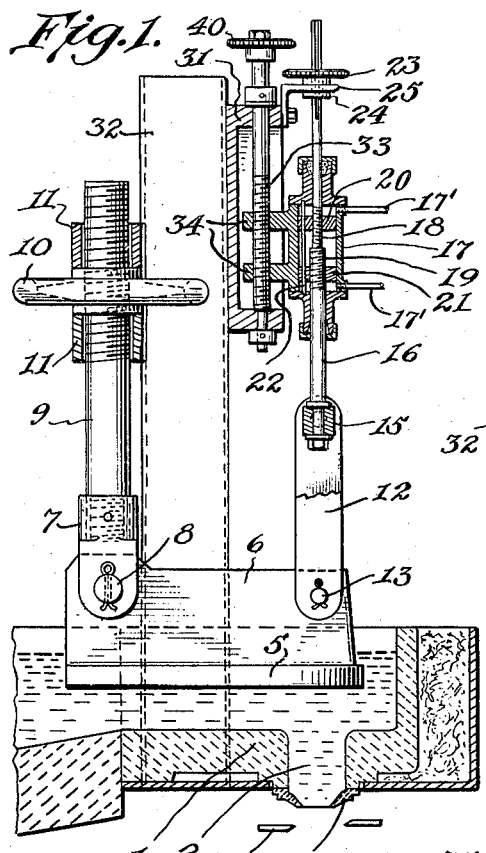
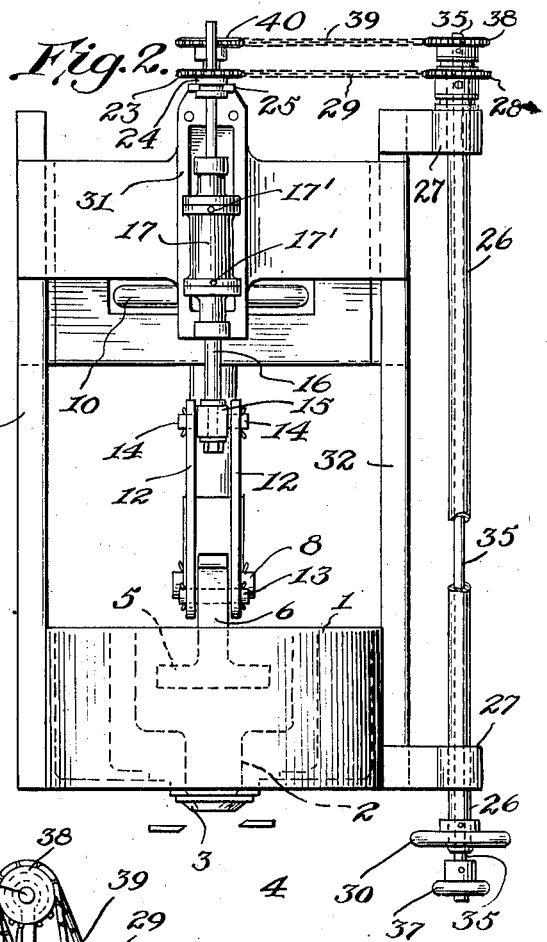
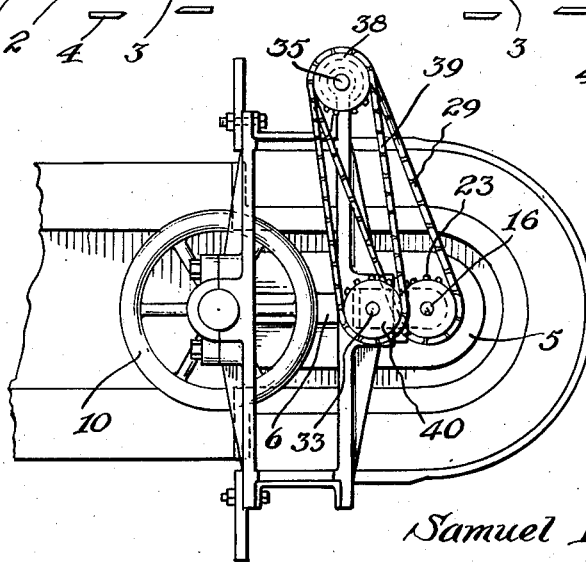
Inventor
Samuel B. Bowman
By Eccleston & Eccleston
Attorneys Patented Apr. 9, 1935

1,997,510

UNITED STATES PATENT OFFICE 1,997,510

GLASS FEEDER

Samuel B. Bowman, Zanesville, Ohio

Application July 27, 1932, Serial No. 625,101

9 Claims. (Cl. 49—55)

For many years past the feeder commonly employed was of the reciprocating plunger type. In such feeders a slender plunger reciprocates over an opening in the bottom of the flow spout, to alternately accelerate and retard the flow of glass through the outlet, to form the charges, which are severed by shears arranged below the outlet. This type of feeder is illustrated in the patent to Brookfield No. 883,779, April 7, 1908.

The reciprocating plunger type of feeder is objectionable in several respects. For example, the plunger being rather small does not have a very sensitive control of the flowing glass; the plunger has little if any mixing action on the glass, so that the glass charges or gobs are not of uniform temperature throughout; and the glass in the flow spout is in a quiescent state except for a narrow deep channel of glass at higher temperature and flowing at a relatively high speed toward the outlet orifice, which results in the sloughing off of portions of the relatively cool glass flanking the hot stream, thereby further aiding in the production of charges which are not uniform in either consistency or temperature. In the present invention, the foregoing objectionable features, and numerous other objectionable features well known to those skilled in the art, are overcome.

The present invention employs neither the well known reciprocating plunger nor alternate pressure and vacuum, for feeding the charges. On the contrary, an entirely new element is employed for this purpose, namely, an oscillating ceiling. By oscillating the ceiling or an equivalent element, manifold advantages result. For example, the broad area of the oscillating ceiling acting on a broad expanse of the glass in the flow spout, as distinguished from the very restricted zone of action of the plunger or air pressure, gives a much more sensitive control of the feeding of the glass; also, the broad expanse of the action of the oscillating ceiling causes a continuous mild agitation of the body of the glass, whereby the fluidity, consistency and temperature of the glass is uniform throughout; also, the action of the new feeder is such that it prevents the formation of narrow channels through which hotter glass flows, and due to a peculiar arrangement of the feeder element glass is positively forced forwardly toward the end of the spout during each cycle of operation of the feeder. The many advantages of the present invention over either the reciprocating plunger feeder or the pneumatic feeder will be apparent to those skilled in the art from the following detailed description when taken in connection with the accompanying drawing; in which, Figure 1 is a vertical longitudinal sectional view of the forward portion of the flow spout with the feeder positioned therein and shown in side elevation; parts of the operating mechanism being shown in section.

Figure 2 is a front end view of the flow spout and feeder, and

Figure 3 is a plan view thereof.

Referring to the drawing in more detail, numeral 1 indicates the forward portion of the flow spout, usually termed the nose block. The floor of the flow spout is provided with the ordinary flow orifice 2, beneath which is arranged the removable bushing 3. Spaced below the bushing is a pair of shears which are illustrated diagrammatically and referred to by numeral 4. The shears are operated by any desired means, and as they are well known and in common use in glass feeders the diagrammatic illustration is sufficient. The shears are periodically operated to sever the formed charges or gobs, which then drop into the molds of a glass forming machine (not shown). All of the structure thus far described is old and well known in the glass industry.

In prior feeders a slender plunger reciprocated in or over the flow orifice 2, and in pneumatic feeders the air pressure on the surface of a restricted portion of the glass over the flow orifice was periodically increased and decreased. In the new type of feeder constituting the present invention the feeding element acts on a broad expanse of glass as distinguished from the restricted zone of action of the plunger feeder and pneumatic feeder. In the preferred embodiment of the invention illustrated herein, the ceiling or roof of the flow spout or nose block constitutes the feeder element and is referred to by numeral 5. In feeders of the plunger and pneumatic type the flow spout is covered by a stationary ceiling or roof provided with a suitable opening through which the plunger or air bell projects. In the present invention the ceiling, referred to by numeral 5, is oscillated so that the ceiling itself constitutes the feeder element.

It will be noted that the ceiling 5 is spaced only a slight distance from the side walls of the spout, so that it covers almost the entire area of the forward portion of the spout; but of course the particular design of the ceiling can be varied widely. In the specific form illustrated a web 6 projects upwardly from the ceiling 5, and the rear end of the web is pivotally mounted in a socket member 7 by means of a pin 8 which passes through a suitable opening in the web. The socket member is mounted on the lower end of a rod 9; the upper portion of the rod being threaded to receive a hand wheel 10, which is arranged between suitably mounted thrust bearings 11. Thus by rotating the hand wheel 10 in the proper direction the pivotal mounting of the rear end of the ceiling may be raised or lowered as desired, and without affecting the position of the pivotal mounting of the forward end of the ceiling. It will be understood, of course, that the invention is in no manner limited to the particular means for making this vertical adjustment.

The forward end of the web 6 is pivotally attached to the lower end of links 12, by means of a pin 13 which passes through holes provided in the links and web. The upper ends of the links 12 are mounted on pins 14 projecting from a block 15 which also functions as a spacer for the links. This block is loosely mounted on the lower end of a piston rod 16, so that the piston rod can be freely rotated, for the purpose to be described. Of course the invention is not limited to the particular means for supporting the forward end of the ceiling.

For the purpose of periodically raising and lowering the forward end of the ceiling, whereby the ceiling is oscillated about its rear pivot 8, any desired means may be provided; and, likewise, any desired means may be provided for adjusting the position of the ceiling and the limits of its movement. Accordingly, the preferred mechanism shown herein for accomplishing these functions, and which mechanism will now be described, is to be considered merely as illustrative.

Numeral 17 refers to the cylinder which operates the piston rod 16. Portions of the piston rod within the cylinder are threaded in opposite directions, as indicated by numerals 18 and 19, and pistons 20 and 21 are mounted on the threaded portions 18 and 19, respectively. The pistons are prevented from rotating by a rod 22 which passes through holes in the piston and has its ends fixed in the ends of the cylinder. It will be apparent that if the piston rod is rotated in one direction the pistons will be caused to approach each other, thereby increasing the length of the piston stroke and accordingly increasing the extent of oscillation of the ceiling; and that if the piston rod is rotated in the opposite direction the pistons will move away from each other and decrease the length of stroke of the piston rod and the ceiling. To provide mechanism for conveniently rotating the piston rod 16, it is extended upwardly beyond the cylinder, and a sprocket wheel 23 is splined on the extension; vertical movement of the sprocket wheel being prevented by a thrust bearing 24 carried by a bracket 25. Numeral 26 refers to a vertical hollow shaft, mounted in bearings 27, and having fixed to its upper end a sprocket wheel 28 operatively connected with sprocket wheel 23 by a sprocket chain 29. Fixed to the lower end of shaft 26 is a handwheel 30, located within easy reach of the operator. It is apparent that by rotating the handwheel in the proper direction the pistons 20 and 21 will be caused to move toward or from each other, as desired, to increase or decrease the extent of oscillating movement of the ceiling 5. The pistons are driven by means of compressed air alternately admitted to opposite ends of the cylinder 17 through pipes 17'. Any desired timing mechanism, such as commonly used with reciprocating plungers or pneumatic feeders, is employed to time the operation of the cylinder 17.

The mechanism for oscillating the ceiling and for varying the extent of oscillation has already been described. It is also desirable to vary the upper or lower limit of the oscillating movement without varying the extent of oscillation. For this purpose, a bracket 31, carried by standards 32, has provided therein a vertical threaded rod 33. The cylinder 17 is provided with lugs 34 having threaded openings to receive the threaded rod 33, so that by rotating the rod the cylinder will be bodily raised or lowered, thereby raising or lowering the forward end of the ceiling 5, but without affecting the extent of oscillating movement of the ceiling. For conveniently rotating the rod 33 a vertical shaft 35 extends through the hollow shaft 26, and has fixed to its lower end a hand wheel 37, and to its upper end a sprocket wheel 38, operatively connected by means of a sprocket chain 39 with a sprocket wheel 40 fixed to the upper end of the rod 33. Thus by rotating the handwheel 37 in the proper direction the forward end of the ceiling is raised or lowered to the desired extent and without changing the extent of oscillation of the ceiling.

A brief description of the operation of the feeder will be sufficient. In the specific embodiment disclosed herein the oscillating ceiling extends from a point slightly to the rear of its rear pivot forwardly to a point slightly beyond the forward side of the flow orifice, and it extends the width of the spout except for a margin around the sides. In the preferred form the ceiling is entirely submerged in the glass, but it will be apparent that the normal position of the ceiling may vary within wide limits and may be only partly immersed in the glass if desired. Likewise, the ceiling may be of lighter weight than the glass, or heavier, or of the same weight as the glass.

It will be apparent that when the ceiling is moved downward it will accelerate the flow of glass through the flow orifice 2 to form the charge or gob of the desired weight, and that when it is moved upwardly it will retard, stop, or reverse the flow of glass, depending upon the speed and extent of the upward movement of the ceiling. The ceiling is preferably lifted instantly after the shears have operated to sever the formed gob suspended beneath the flow orifice; but obviously the time of operation of the shears with respect to the time of movement of the ceiling, is a matter of choice.

In the two types of feeders commonly used heretofore, the plunger feeder and the pneumatic feeder, both the plunger and the air acted in a very restricted zone; while in the type of feeder constituting the present invention, just the contrary is true, the feeder element acting over a broad expanse of glass. Accordingly, it will be apparent that the feeder element of the present invention gives a far more sensitive control of the feeding operation than has been possible heretofore. It will also be apparent that practically all of the glass in the forward portion of the flow spout will be kept in a constant state of mild agitation whereby the highly desirable mixing action is obtained, thus preventing the formation of a narrow channel of hotter glass flanked by regions of cooler glass, so that the glass in the spout, and the charges or gobs delivered therefrom are of uniform consistency and temperature. It will also be apparent, in the specific embodiment of the invention disclosed herein, that as the rear pivot of the ceiling is forward of the rear end of the ceiling, in every upward movement of the forward end of the ceiling the rear end or heel of the ceiling tends to propel the glass forwardly toward the flow orifice, which adds to the mixing action and the maintenance of uniform temperature.

It has been mentioned hereinbefore that the present invention is not limited to any specific apparatus for operating the ceiling or to any specific means providing the desired adjustments. It should be mentioned, however, that the operating means and adjustments disclosed herein give a much better control of the feeder element than has been possible heretofore. For example, it is possible to raise or lower the rear end of the feeder element without affecting in any way the forward end thereof; or, the forward end of the feeder element may be raised or lowered without affecting the rear end; or, the limits of the oscillating movement may be varied without affecting the extent of such movement and without affecting the rear end of the feeder element, etc. Briefly stated, by the mechanism shown it is possible to obtain any desired position or movement of the feeder element, thereby providing a new and most desirable control of the glass. It is recognized, however, that these new effects could be produced by apparatus widely different from the particular apparatus shown and described herein, and accordingly it is to be understood that the present invention is not limited to the particular apparatus shown, and it should be considered merely as illustrative.

Having fully described the invention, what I claim as new is:

1. A glass feeder including a flow spout having a flow orifice in the bottom thereof, a ceiling for the flow spout having its rear end pivotally mounted, said ceiling extending forwardly over the flow orifice, means for periodically raising and lowering the forward end of the ceiling, and means for raising or lowering the rear end of the ceiling.

2. A glass feeder including a flow spout having a flow orifice in the bottom thereof, a refractory member pivotally mounted rearwardly of the flow orifice, said refractory member extending over the flow orifice, and means for oscillating said member about its pivot.

3. A glass feeder including a flow spout having a flow orifice in its bottom, a refractory member extending from a point a substantial distance rearwardly of the flow orifice to a point over the flow orifice, said refractory member being pivotally mounted at a point forward of its rear end, and means for oscillating said member.

4. A glass feeder including a flow spout having a flow orifice in its bottom, a refractory member extending from a point a substantial distance rearwardly of the flow orifice to a point adjacent the flow orifice, said refractory member having its rear end pivotally mounted, means for oscillating said member about its pivot, and means for varying the extent of the oscillating movement.

5. A glass feeder including a flow spout having a flow orifice in its bottom, a refractory member extending from a point a substantial distance rearwardly of the flow orifice to a point adjacent the flow orifice, said refractory member having its rear end pivotally mounted, means for oscillating said member about its pivot, and means for adjusting the position of the pivot.

6. A glass feeder including a flow spout having a flow orifice in its bottom, a refractory member extending from a point a substantial distance laterally of the flow orifice to a point adjacent the flow orifice, means for pivotally mounting one end of said member, and means for oscillating the member about said pivot.

7. A glass feeder including a flow spout having a flow orifice in its bottom, a refractory member extending from a point a substantial distance rearwardly of the flow orifice to a point adjacent the flow orifice, said refractory member having its rear end pivotally mounted, means for oscillating said member about its pivot, means for varying the extent of the oscillating movement, and means for varying the path of the oscillating movement without varying the extent of the movement.

8. A glass feeder including a flow spout having a flow orifice in its bottom, a refractory member extending from a point a substantial distance rearwardly of the flow orifice to a point adjacent the flow orifice, said refractory member having its rear end pivotally mounted, means for oscillating said member about its pivot, means for varying the extent of the oscillating movement, means for varying the path of the oscillating movement without varying the extent of the movement, and means for adjusting the position of the pivot.

9. A glass feeder including a flow spout having a flow orifice in the bottom thereof, a refractory member pivotally mounted at one side of the flow orifice, said refractory member extending over the flow orifice, and means for oscillating said member about its pivot.

SAMUEL B. BOWMAN.